(12) United States Patent
Rand et al.

(10) Patent No.: US 11,768,787 B2
(45) Date of Patent: Sep. 26, 2023

(54) CONNECTORS FOR AUDIO DATA TRANSFER

(71) Applicant: Cirrus Logic International Semiconductor Ltd., Edinburgh (GB)

(72) Inventors: Robert David Rand, Peebles (GB); Graeme Gordon Mackay, Dunfermline (GB); Andrew James Howlett, Edinburgh (GB)

(73) Assignee: Cirrus Logic Inc., Austin, TX (US)

(*) Notice: Subject to any disclaimer, the term of this patent is extended or adjusted under 35 U.S.C. 154(b) by 248 days.

(21) Appl. No.: 16/256,162

(22) Filed: Jan. 24, 2019

(65) Prior Publication Data

US 2019/0220430 A1 Jul. 18, 2019

Related U.S. Application Data

(63) Continuation of application No. 15/051,995, filed on Feb. 24, 2016, now Pat. No. 10,198,386.
(Continued)

(30) Foreign Application Priority Data

May 26, 2015 (GB) ..................... 1508994

(51) Int. Cl.
*G06F 13/12* (2006.01)
*G06F 13/38* (2006.01)
*G06F 13/40* (2006.01)

(52) U.S. Cl.
CPC .......... *G06F 13/385* (2013.01); *G06F 13/122* (2013.01); *G06F 13/382* (2013.01); *G06F 13/4022* (2013.01)

(58) Field of Classification Search
CPC .... G06F 13/382; G06F 13/385; G06F 13/387; G06F 13/38
(Continued)

(56) References Cited

U.S. PATENT DOCUMENTS

2006/0053239 A1 3/2006 Zheng et al.
2008/0082838 A1 4/2008 Achariyakosol et al.
(Continued)

FOREIGN PATENT DOCUMENTS

CN 102726061 A 10/2012
CN 103916724 A 7/2014
(Continued)

OTHER PUBLICATIONS

Revision:"Uinversal Serial Bus type-C cable and connector specification Revision 1.0", Aug. 11, 2014, Retrieved from the internet: www.those.ch/designtechnik/wp-content/upload/2014/08/7sb-type-c-specification-Release-1.0.pdf(retrieved (Year: 2014).*
(Continued)

*Primary Examiner* — Henry Tsai
*Assistant Examiner* — Kim T Huynh
(74) *Attorney, Agent, or Firm* — Jackson Walker L.L.P

(57) ABSTRACT

This application relates to methods and apparatus for transfer of data between a host device (400) and a peripheral device (300) via a USB Type-C connector (100; 304) of the host device. A data controller is described that has a path controller (309, 310; 706) for establishing signal paths between circuitry of the host device and contacts (101) of said USB Type-C connector. The path controller is operable in at least first and second modes. In the first mode the path controller establishes separate signal paths to each of at least first, second, third and fourth contacts (A6, A7, B6, B7) of the USB Type-C connector and a plurality of the established signal paths are for transfer of analogue audio data. In the second mode the path controller establishes a pair of signal paths to only a subset of said first to fourth contacts to provide a differential digital data path.

15 Claims, 5 Drawing Sheets

Related U.S. Application Data

(60) Provisional application No. 62/120,587, filed on Feb. 25, 2015.

(58) Field of Classification Search
USPC ...................................... 710/36–48, 300–310
See application file for complete search history.

(56) References Cited

U.S. PATENT DOCUMENTS

| | | |
|---|---|---|
| 2008/0228969 A1 | 9/2008 | Cheah et al. |
| 2008/0309313 A1 | 12/2008 | Farrar et al. |
| 2009/0077595 A1* | 3/2009 | Sizelove ............... G06F 1/1626 |
| | | 725/76 |
| 2010/0109795 A1* | 5/2010 | Jones ..................... G09G 5/006 |
| | | 333/101 |
| 2011/0116646 A1 | 5/2011 | Sander et al. |
| 2012/0275624 A1* | 11/2012 | Ho ........................... H03F 1/02 |
| | | 381/107 |
| 2013/0075149 A1 | 3/2013 | Golko et al. |
| 2013/0089291 A1 | 4/2013 | Joi et al. |
| 2013/0095702 A1 | 4/2013 | Golko et al. |
| 2013/0244491 A1 | 9/2013 | Sarwar et al. |
| 2014/0004741 A1 | 1/2014 | Joi et al. |
| 2014/0075069 A1 | 3/2014 | Mullins et al. |
| 2014/0170907 A1 | 6/2014 | Golko et al. |
| 2014/0185821 A1 | 7/2014 | Ushakov |
| 2014/0322930 A1* | 10/2014 | Sizelove .......... H04N 21/43637 |
| | | 439/40 |
| 2015/0269102 A1* | 9/2015 | Inha .................... G06F 13/4022 |
| | | 710/316 |
| 2016/0179648 A1* | 6/2016 | Srivastava ............ G06F 13/387 |
| | | 710/16 |
| 2019/0058617 A1* | 2/2019 | Kolsrud ................ G06F 13/382 |
| 2019/0128949 A1* | 5/2019 | Bowlerwell ........... G01R 31/68 |

FOREIGN PATENT DOCUMENTS

| | | |
|---|---|---|
| CN | 102752682 B | 7/2015 |
| KR | 20110091716 A | 8/2011 |
| WO | 2011125998 A | 10/2011 |

OTHER PUBLICATIONS

International Search Report and Written Opinion of the International Searching Authority, International Application No. PCT/GB2016/050466, dated May 20, 2016, 11 pages.
Combined Search and Examination Report under Sections 17 and 18(3), UKIPO, Application No. GB1708498.9, dated Dec. 7, 2017.
Revision: "Universal Serial Bus Type-C Cable and Connector Specification Revision 1.0", Aug. 11, 2014, XP055271614, Retrieved from the Internet: www.those.ch/designtechnik/wp-content/uploads/2014/08/USB-Type-C-Specification-Release-1.0.pdf [retrieved on May 10, 2016], pp. 166-170.
Combined Search and Examination Report under Sections 17 and 18(3), UKIPO, Application No. GB1508994.9, dated Nov. 30, 2015.
Search Report under Section 17(6), UKIPO, Application No. GB1708498.9, dated Feb. 3, 2016.
First Office Action, China National Intellectual Property Administration, Application No. 2016800122627, dated Jan. 6, 2020.
Notice of Preliminary Rejection, Korean Intellectual Property Office, KR Patent Application No. 10-2017-7023912, dated Apr. 29, 2022.

* cited by examiner

CONNECTORS FOR AUDIO DATA TRANSFER

This application is a continuation of U.S. patent application Ser. No. 15/051,995, filed Feb. 24, 2016, which claims benefit of U.S. Provisional Application Ser. No. 62/120,587, filed Feb. 25, 2015, and United Kingdom Patent Application No. 1508994.9, filed May 26, 2015, each of which is incorporated by reference herein in its entirety.

The field of representative embodiments of this disclosure relates to methods, apparatuses, or implementations concerning or relating to connectors for audio data transfer and especially to bi-directional transfer of multiple analogue audio data channels, and in particular to transfer via a general or multi-purpose data connector.

Many contemporary electronic devices have the facility to connect with external or peripheral audio devices. For instance, mobile telephones, tablets, laptop computers, mp3 players and the like are examples of electronic devices that are operable with peripheral audio devices such as a headset, for example, that is external to and distinct from the electronic device. A peripheral device such as a headset may typically comprise mono or stereo speakers for audio playback and possibly a microphone for voice communication.

Such external peripheral audio devices are often connected via a mating connector such as a plug and socket arrangement. For instance, many audio peripherals such as headsets have a jack plug such as a 3.5 mm jack plug for connection to a suitable jack socket on the host electronic device. A well-known arrangement for a jack plug and its associated socket is TRRS (Tip-Ring-Ring-Sleeve), which has four contacts for left audio, right audio, microphone, and ground. In one known arrangement, the tip (T) and first ring (R1) are used for left (L) and right (R) audio, for example left and right loudspeakers, with the second ring (R2) and sleeve (S) used for the microphone (M) and ground return (G) respectively. It will be appreciated that different arrangements for the left and right audio, microphone, and ground contacts are also possible. This provides for transfer of two channels of analogue audio data from the host device to the peripheral and transfer of a single channel of analogue audio data from the peripheral microphone to the host device.

Some peripherals devices such as headsets may comprise one or more microphone provided for noise cancellation, which are distinct from, and thus additional to, any microphone provided for voice communication. For example a headset may include one or more additional microphones for detecting ambient noise so that compensating signals may be added to the playback audio to cancel out the ambient noise.

Typically the noise cancellation is performed in the peripheral itself. Thus the electronics to generate an appropriate cancellation signal may be provided in a headset itself, for instance in a dongle in the cable, wired to the multiple microphones. As power is required for the noise cancellation electronics the housing for the electronics may also need to include a battery, making it relatively bulky and heavy, which can be undesirable for a headset.

To avoid this, it has been proposed for the noise cancellation electronics to be provided in the host device, for instance a telephone handset. However this would require extra connections via the audio jack to allow transfer of audio data from the noise cancelling microphones to the host device.

Various solutions have been proposed, including non-standard jacks with extra poles or jack arrangements with more than one plug. However no standard arrangement has emerged.

Portable audio devices may also have a multi-pole socket to allow them to be mounted in a docking station or suchlike. However jack plugs for attachment to these sockets have generally been physically large and the connections not robust enough mechanically to cope reliably with the pulling and twisting encountered by a jack attached to a device in many use patterns, e.g. in a pocket.

Embodiments of the present invention provide methods and apparatus for transfer of multiple channels of analogue audio data.

In accordance with an aspect of the invention there is provided a data controller for controlling transfer of data between a host device and a peripheral device via a USB Type-C connector of the host device, the data controller comprising:

a path controller for establishing signal paths between circuitry of the host device and contacts of said USB Type-C connector,
wherein the path controller is operable in at least first and second modes, wherein:
in the first mode the path controller establishes separate signal paths to each of at least first, second, third and fourth contacts of the USB Type-C connector, wherein a plurality of said signal paths are for transfer of analogue audio data; and
in the second mode the path controller establishes a pair of signal paths to only a subset of said first to fourth contacts to provide a differential digital data path.

The USB Type-C connector may comprise first and second rows of contacts and the first and second contacts may be the central two contacts of the first row and the third and fourth contacts may be the central two contacts of the second row.

In the first mode the path controller may additionally establish a separate analogue signal path to one of at least a fifth or sixth contact of the USB Type-C controller.

In some embodiments, when entering the first mode, the data controller may be configured to determine a connection configuration for the peripheral device, wherein the connection configuration indicates whether each of the first to fourth contacts of the USB Type-C connector is connected to a microphone or a loudspeaker of the peripheral device. The path controller may establish the signal paths in the first mode based on the determined connection configuration.

The data controller may comprise a discovery module configured to monitor the electrical properties of at least one contact of the USB Type-C connector to determine a type of connection for that contact. The discovery module may be configured to, when entering the first mode, monitor the electrical properties of at least one of the first to fourth contacts of the USB Type-C connector to determine whether the respective contact is connected to a microphone or a loudspeaker of the peripheral device. The discovery module may additionally or alternatively be configured to determine which of at least two predetermined additional contacts of the USB Type-C connector is a ground contact connected to a ground return for the peripheral device. The path controller may be further operable to establish a ground path to said determined ground contact. The discovery module may, for instance, be configured to determine which of a fifth or sixth contact of the USB Type-C connector is connected to a microphone and to identify the other of said fifth or sixth contact as the ground contact.

The data controller may be configured to determine the connection configuration based on the type of connection determined for at least one contact of the USB Type-C connector and a plurality of predetermined possible connection configurations.

In some embodiments the data controller may comprise a switch array connected to the USB Type-C controller, and the path controller may control the switch array to provide at least some of said signal paths in the first mode. The switch array may comprises a first set of switches, the first set of switches being operable, in the first mode: in a first switch state to connect the first and second contacts to first and second signal paths respectively and to connect the third and fourth contacts to third and fourth signal paths respectively; and in a second switch state to connect the first and second contacts to the third and fourth signal paths respectively and to connect the third and fourth contacts to the first and second signal paths respectively.

In some embodiments the path controller may be operable in the first mode to enable or disable one or more audio components of a host device to establish said separate signal paths.

The path controller may comprise a USB physical controller.

At least one of the signal paths in the first mode may be a loudspeaker signal path for transfer of analogue audio signals from an amplifier of the host device to drive a loudspeaker of the peripheral device. The signal paths in the first mode may comprise two loudspeaker signal paths for left and right stereo audio signals. The path controller may be operable in the first mode to establish the two loudspeaker signal paths to either of said first and second contacts or to said third or fourth contacts.

Additionally or alternatively at least one of said signal paths in the first mode may be a microphone signal path for transfer of audio signals received from a microphone of the peripheral device to audio processing circuitry in the host device. At least one microphone signal path may be an analogue signal path for transfer of analogue audio signals received from a microphone of the peripheral device and/or at least one microphone signal path may be a digital signal path for transfer of digital audio signals received from at least one digital microphone of the peripheral device. In either case at least one microphone signal path may be a signal path for audio signals received from a noise cancellation microphone and said audio processing circuitry comprises noise cancellation circuitry. The signal paths in the first mode may comprise two microphone signal paths for audio signals received from left and right noise cancellation microphones, in which case the path controller may be operable in the first mode to establish the two microphone signal paths to either of said first and second contacts or to said third or fourth contacts.

The subset of the first to fourth contacts in the second mode may be either a first subset which includes the first and second contacts and not the third and fourth contacts or a second subset which includes the third and fourth contacts and not the first and second contacts.

In some embodiments the path controller may be further operable in a third mode to establish just two analogue signal paths to said first to fourth contact for transfer of left and right analogue stereo audio data to loudspeakers of a peripheral device.

Embodiments also provide for an electronic device comprising: a USB Type-C connector; and a data controller in any of the variants discussed above.

The electronic device may further comprise an audio codec and the path controller may be configured, in the first mode, to establish said signals paths between the USB Type-C connector and the audio codec. The electronic device may further comprise a USB controller and the path controller may be configured, in the second mode, to establish said signals paths between the USB Type-C connector and the USB controller.

The electronic device may be at least one of: a portable device; a battery powered device; a communications device; a computing device; a mobile telephone; a laptop, notebook or tablet computer; a personal media player; a gaming device; and a wearable device.

In a second aspect there is provided an audio controller for controlling transfer of audio data between a host device and a peripheral device via a USB Type-C connector of the host device, the audio controller comprising:

a path control module for establishing audio signal paths between audio circuitry of the host device and contacts of said USB Type-C connector, wherein the path control module is operable in a first mode to establish separate audio signal paths to each of at least four contacts of the USB Type-C connector, wherein a plurality of said audio signal paths are for transfer of analogue audio data.

In the first mode, the path controller may be operable to establish an audio signal path to five contacts of the USB Type-C connector. The path controller may further be operable to establish a ground path to a contact of the USB Type-C connector to provide a ground return for the peripheral device.

The audio controller may comprise a ground discovery module configured to determine which of at least two predetermined contacts of the USB Type-C connector is connected to a ground return for the peripheral device, and the path control module may be responsive to the ground discovery module to establish appropriate signal paths. The ground discovery module may be configured to determine which of two predetermined contacts of the USB Type-C connector exhibits an impedance associated with a microphone and to associate said contact as a microphone contact and the other of said two predetermined contacts as a ground contact. The path control module may be configured to associate each of a predetermined set of contacts of the USB Type-C connector as a microphone contact for receipt of audio signals from a microphone of the peripheral device or as a loudspeaker contact for transmission of audio signals to drive a loudspeaker of the peripheral device based on which contact of the USB connectors identified as being connected to the ground return of the peripheral device.

Additionally or alternatively the audio controller may comprise a transducer discovery module configured to determine whether each of a predetermined set of contacts of the USB Type-C connector is connected to a microphone or a loudspeaker of the peripheral device and the path control module may be responsive to the ground discovery module to establish appropriate signal paths. The transducer discovery module may be configured to determine which of the predetermined set of contacts exhibits an impedance associated with a microphone and to associate said contact as a microphone contact and which of the predetermined set of contacts exhibits an impedance associated with a loudspeaker and to associate said contact as a loudspeaker contact.

At least one of the signal paths in the first mode may be a loudspeaker signal path for transfer of analogue audio signals from an amplifier of the host device to drive a loudspeaker of the peripheral device. The signal paths in the first mode may comprise two loudspeaker signal paths for left and right stereo audio signals.

At least one of said signal paths in the first mode may be a microphone signal path for transfer of audio signals received from a microphone of the peripheral device to audio processing circuitry. At least one microphone signal path may be an analogue signal path for transfer of analogue audio signals received from a microphone of the peripheral device and/or at least one microphone signal path may be a digital signal path for transfer of digital audio signals received from at least one digital microphone of the peripheral device. In either case at least one microphone signal path may be a signal path for audio signals received from a noise cancellation microphone and the audio processing circuitry may comprise noise cancellation circuitry.

In some embodiments in the first mode, the signal paths may comprise two loudspeaker audio signal paths transfer of left and right stereo analogue audio signals to respective loudspeakers of the peripheral device and two microphone signals paths for transfer of audio signals received from noise cancelling microphone of the peripheral device associated with loudspeakers of the peripheral device.

In a further aspect there is provided an apparatus for audio data transfer comprising: a first connector for mating with a corresponding USB type-C connector; wherein the apparatus is operable to establish, in use, at least four separate signal paths for transfer of audio data via the first connector, wherein a plurality of said audio signal paths are for transfer of analogue audio data.

In a yet further aspect there is provided an audio accessory device comprising: at least four audio transducers; a first connector, and signal paths for transfer of audio signal between separate contacts of the first connector and respective ones of each of said at least four audio transducers; wherein the first connector is compatible with a USB Type-C connector and at least a plurality of said signal paths are for signals paths for transfer of analogue audio signals.

The first connector may comprise two rows of contacts and a respective one of said signal paths may extend between each of the central two contacts of each of the two rows and a respective one of the at least four audio transducers.

In a further aspect there is provided an electronic device comprising: a first connector having a plurality of contacts for connecting to a peripheral device; a switch array connecting the contacts of the first connector to circuitry of the device; and a connector controller operable to control the switch array to operate the first connector for the transfer of digital data; wherein the controller is further operable in an analogue mode to configure the switch array to provide at least four separate audio signal paths between audio circuitry of the device and contacts of the first connector, wherein a plurality of said audio signal paths are for transfer of analogue audio data.

Embodiments also relate to an apparatus comprising:
a first connector having at least a first set of eight contacts positioned so as exhibit rotational symmetry in a plane about a first axis such that the first connector may, in use, mate in either of two possible orientations with a connector of a peripheral device having a corresponding set of eight contacts; and
a controller for controlling the configuration of signal paths to at least the four contacts of said first set which are closest to said first axis based on a determination of loads connected to at least some of said first set of contacts when mated with a connector or a peripheral device.

The controller may determine the loads connected to at least some of the first set of contacts by monitoring electrical properties detected at said contacts when mated with a connector or a peripheral device. The controller may determine the load connected to at least one of the four contacts of said first set which are closest to said first axis.

In a further aspect there is provided a method of audio data transfer in an apparatus having a USB Type-C connector, the method comprising:
detecting that a peripheral device requiring an analogue signal path is connected to said apparatus via the USB Type-C connector;
determining a connection configuration for the peripheral device; and
establishing appropriate signal paths to contacts of the USB Type-C connector based on the connection configuration;
wherein establishing said signal paths comprises establishing separate signal paths to each of at least four of the contacts of the USB Type-C connector, wherein a plurality of said signal paths are for transfer of analogue audio data.

Determining a connection configuration may comprise determining a type of load of the peripheral device connected at at least one of first, second, third and fourth contacts of the USB type-C connector, wherein the first and second contacts are the central contacts of a first row of contacts and the third and fourth contacts are the central contacts of a second row of contacts. Establishing the signal paths may comprise establishing separate signal paths to each of said first, second, third and fourth contacts.

Embodiments of the invention will now be described by way of example only with respect to the accompanying drawings, of which:

Figure 1:
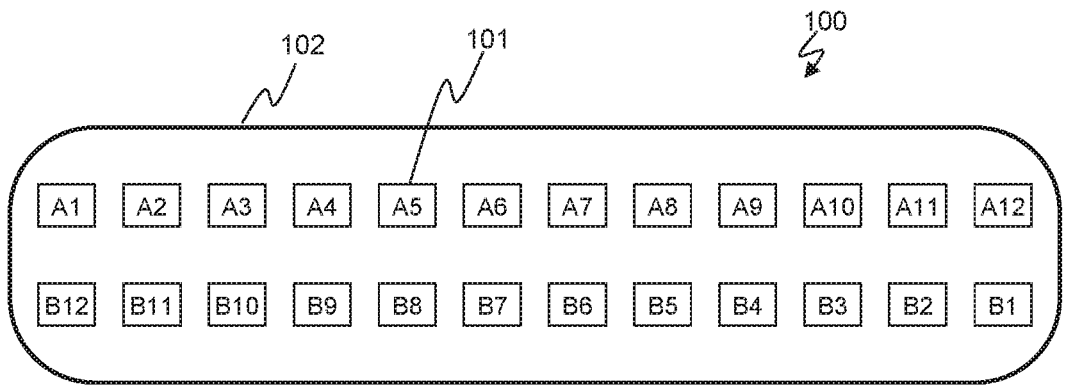
FIG. 1 illustrates USB Type-C connector arrangement.

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present invention relate to methods and apparatus for analogue data transfer, in particular audio data, with multiple analogue channels. Some embodiments provide bidirectional data transfer with multiple analogue channels in each direction. Embodiments thus allow a host device to transfer multiple channels of audio data to a peripheral device such as a headset via multiple analogue signal paths and also to receive multiple channels of audio data from a peripheral device via separate multiple analogue signal paths, thus allowing for simultaneous two-way transfer with a plurality of analogue channels in each direction. The multiple analogue audio channels received from the peripheral device may comprise at least one channel of analogue microphone data for noise cancellation. In some embodiments however there may be more than three analogue audio channels in one direction.

In some embodiments the data transfer may be via a first connector of the host device which is provided as a multipurpose or general purpose connector. In other words the first connector may not be a dedicated analogue audio connector. In at least some embodiments the first connector of the host device may also be operable as a connector for digital data transfer. In some embodiments the connector may be a USB compatible connector and may for example be operable as or compatible with a USB type-C connector.

Recently a new, compact 24-pin connector USB Type-C has been proposed. The USB type-C connector is a reversible connector, i.e. it is rotationally symmetric (with a rotational symmetry of order 2) and is designed to be operable with a type-C plug mated with a type-C receptacle in either possible mating orientation. The type-C connector is designed to be suitable for data transfer according to the present USB 3.1 specification for high data rate transfer and the USB type-C connector is, for example, particularly suitable for passing digital data at high data rates for e.g. video data transmission.

As used in this disclosure the term "USB type-C" or just "type-C" shall be taken to refer to compatibility with the USB type-C specification, which at the time of writing is the "Universal Serial Bus Type-C Cable and Connector Specification" Release 1.0, Aug. 11, 2014 available (at the time of writing) from the USB organisation website at: http://www.usb.org/developers/docs/, the contents of which are incorporated herein by reference thereto. The term type-C shall be taken to mean any connector which is compatible with the release 1.0 specification identified above or compatible with the specification as it may be modified in the future. Aspects of the invention may also be applicable to other similar present or future connectors and in particular any future rotationally symmetric connectors.

FIG. 1 illustrates the principles of a USB type-C connector 100. The connector has two rows of pins or contacts 101, with twelve pins in each row. Note that as used in this specification the term pin in relation to a connector shall mean an electrical terminal that may establish an electrical connection with a corresponding terminal of another connector when the connectors are correctly mated and the term contact shall mean the same. The pins are arranged so that the rows are rotationally symmetric (of order 2). By convention the pins in one row are identified as A1 to A12 and the pins of the other row are labelled B1 to B12. For ease of reference the pins are numbered so that a pin of a type-C receptacle, i.e. a socket or similar type of mating connector that may for instance be provided in a host device, has the same number as the pins of a type-C plug that might mate with that connector. The numbering of the pins of the receptacle may increase in a generally clockwise fashion as illustrated in FIG. 1, i.e. FIG. 1 illustrates the pin labelling for a view looking into the mouth of a type-C receptacle. For a type-C plug the numbering, as seen from a view looking into the plug, would instead increase in an anti-clockwise direction. Thus pin A3 say of a receptacle would mate with pin A3 of a corresponding plug or pin B3 if the plug was inserted in the rotated orientation.

The pins of type-C connector may be provided at least partly surrounded by a guide 102, which could for instance be the walls of a socket or, for a plug, some protective/guiding sheath, which may also be rotationally symmetric and may for instance have the form of a rounded rectangle.

As mentioned above the USB Type-C connector is designed to be suitable for fast digital data transfer, as well as power delivery, and can be seen as a general purpose or multi-purpose data connector. Whilst primarily envisaged for use for digital data transfer the USB Type-C specification describes that a stereo headset may be connected to a host device via a type-C receptacle of the host device by use of a separate adapter with a jack socket for a standard 3.5 mm TRRS audio jack plug and a USB-type C plug. Annex A of the USB type C specification describes this (Analog Accessory Adapter Mode).

Figure 2:
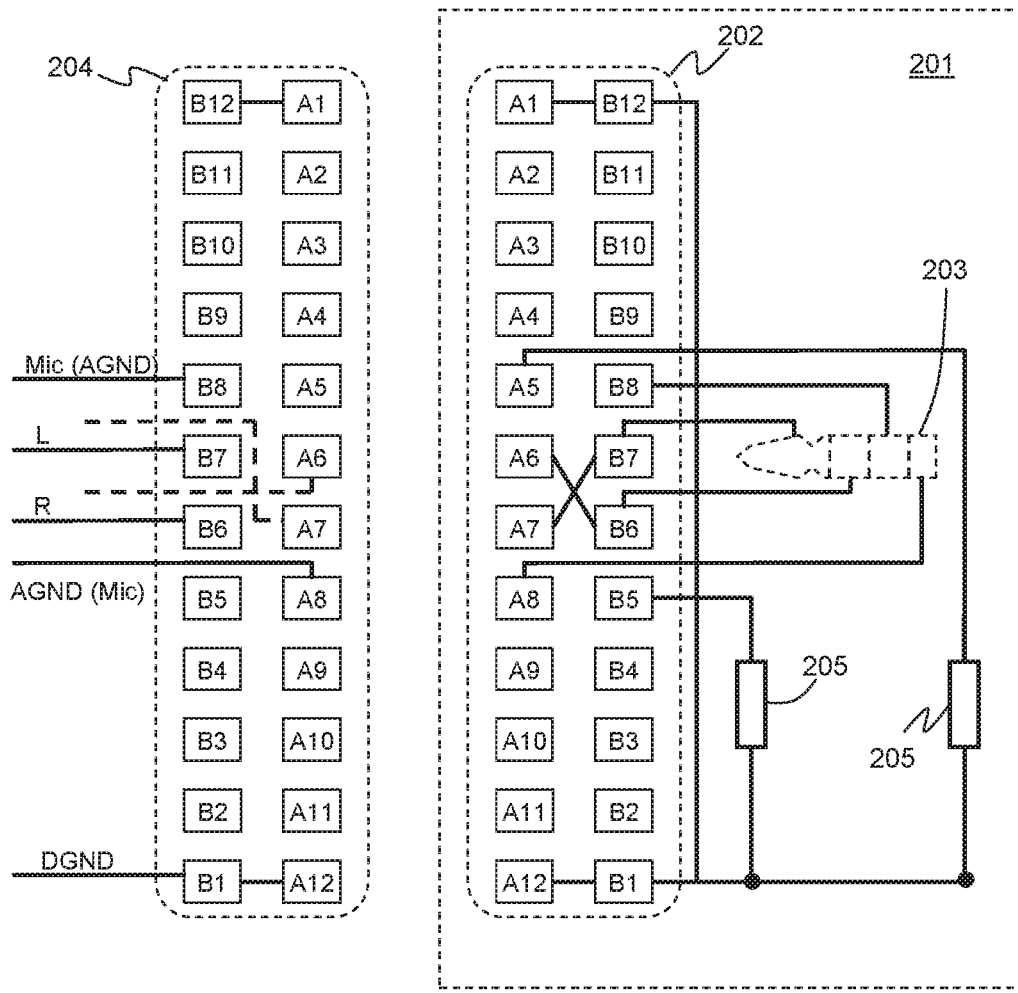
FIG. 2 illustrates a USB Type-C to audio jack adapter.

FIG. 2 illustrates an example of how a USB Type-C adapter may be used to connect to a legacy peripheral audio device via a standard TRRS jack connector. FIG. 2 illustrates an adapter 201 which includes a Type-C compatible plug 202 and a jack socket 203 for receiving a 3.5 mm TRRS jack plug. In use the USB Type-C plug 202 may be connected to a USB type-C receptacle 204 of a host device and the jack socket 203 may be mated with a jack plug (not shown) of a peripheral device such as a headset. In practice the USB plug 202 of the adapter may be connected to the jack socket 203 via a suitable cable, i.e. a cable with a USB Type-C plug at one end and a non-USB connector at the other end.

The central four pins of each row of the type-C connector are used in Analog Accessory Adapter Mode, e.g. to provide a ground path and for data transfer. Pins A7 and B7 of the adapter plug 202 may be shorted together and connected to a tip contact of the jack socket. Pins A6 and B6 of the adapter plug 202 may be shorted together and connected to a first ring contact of the jack socket. This means that, when mated, pin B7 of the receptacle will be connected to the tip contact of the jack socket, whether via pin B7 of the plug 202 in one orientation or via pin A7 of the plug 202 in the other orientation. Likewise pin B6 of the receptacle will be in contact with the first ring contact. As is conventional the tip contact is for left audio data and the first ring contact is for right audio data and so analogue audio data for the left speaker may be transmitted from the host device via pin B7 of the receptacle (or equivalently pin A7) and analogue audio data for the right speaker may be transmitted via pin B6 (or equivalently pin A6).

Pin A8 of the plug 202 is connected to the sleeve contact and pin B8 of the plug 202 is connected to the second ring contact. When the plug 202 is mated with the receptacle, pin A8 of the receptacle will thus be connected either to the sleeve contact or second ring contact depending on orientation, with pin B8 of the receptacle being connected to the other of these two contacts. As is conventional the second ring contact and sleeve contact as used for receiving the microphone signal and a ground for the accessory (termed analog ground), however different manufacturers have different standards and thus it is conventional for a host device to be able to determine whether a contact is used for the microphone signal or ground. Conventional discovery techniques can therefore be applied in the host device to the signal path(s) established by receptacle pin A8 and/or B8 to determine which path is a microphone path and which is ground.

For identification and discovery purposes the adapter 201 includes impedances 205 connected between plug pins A5 and B5 respectively and a common connection between plug pins A1, B12, B1 and A12. When mated at least one of the plug pins A1, B12, B1 and A12 will be connected to a ground, referred to as digital ground. The host device can thus determine whether to operate in the Analog Accessory Adapter Mode, rather than other normal USB-related modes, by detecting the impedances 205 presented on receptacle contacts A5 and B5 when mated to adaptor 201. The impedances 205 have a characteristic value of less than 1.2 kohms.

The Analog Accessory Adapter Mode thus provides a method of using a USB Type-C connector to operate a peripheral audio device by transmitting and receiving analogue audio data. The method is capable of data transfer with a peripheral device having two loudspeakers and a single microphone via a suitable adapter. It will be appreciated however that whilst an adapter may be required to allow use with legacy peripheral devices, future peripheral devices could be provided with a USB Type-C connector using the same principles, allowing direct connection via a captive cable, thus avoiding the need for a jack plug and jack socket.

However the data transfer is still limited to receiving data from a single microphone. The unused pins are specifically not to be connected, and are dedicated for specific uses such as supply or digital ground pins or very high speed USB data channels that are critical in how they are electrically terminated.

As mentioned above some embodiments of the present invention relate to methods and apparatus for analogue data transfer, in particular audio data, with bidirectional data transfer and multiple analogue channels in each direction.

Figure 3:
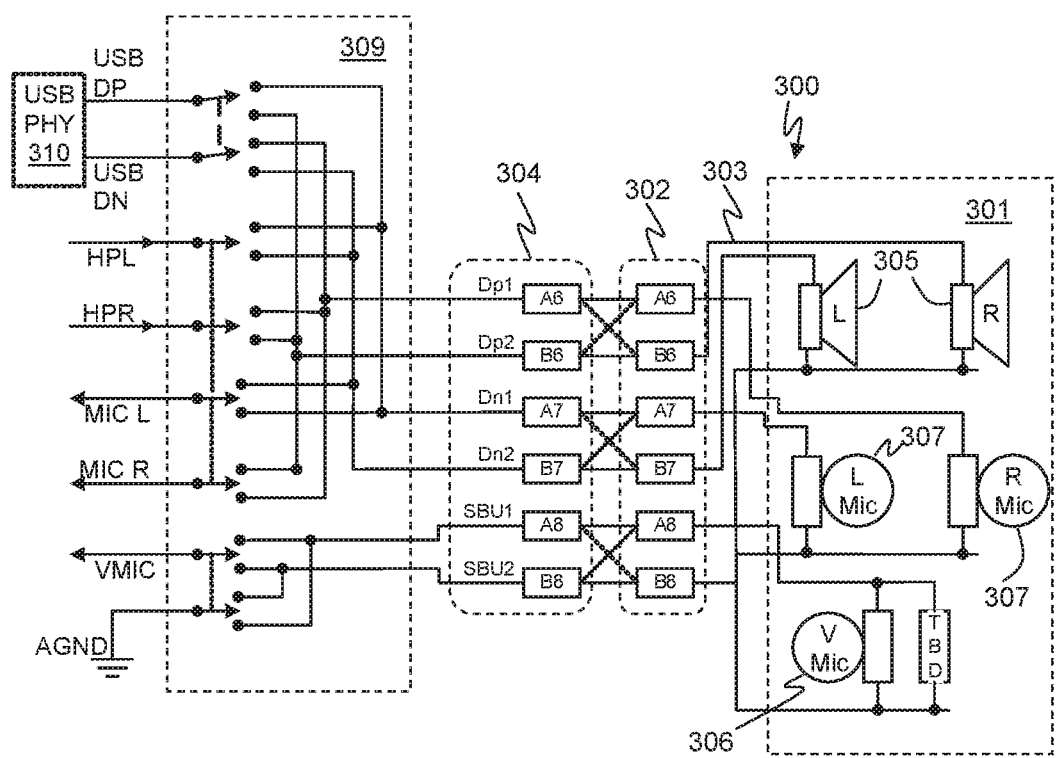
FIG. 3 illustrates a connector arrangement according to an embodiment of the invention.

FIG. 3 illustrates how a peripheral device 300 may be connected to a host device via a USB type-C compatible connector with transfer of multiple channels of audio data from the peripheral or accessory to the host device. The peripheral or accessory device 300 may comprise a body 301 which is connected to a USB type-C compatible connector 302, such as a USB type-C compatible plug via connections 303. In some embodiments the USB Type-C plug may be hardwired to the accessory body 301 and thus the connection 303 may comprise a captive cable. In some embodiments however the type-C plug 302 may form part of an adapter and have a device specific connector, such as a socket (not shown in FIG. 3), for connecting to the audio accessory body 301. For ease the examples will be described by reference to an accessory or peripheral with a type-C connector, i.e. where plug 302 and connections 303 are part of the accessory 300.

In use the USB Type-C plug 302 may mate with a USB type-C receptacle 304 of a host device. Note that for ease of illustration FIG. 3 only illustrates some of the pins of the plug 302 and receptacle 304 and does not attempt to show the rotational symmetry explained previously.

In the example of FIG. 3 the audio accessory or peripheral device 300 comprises loudspeakers 305 for stereo audio and a microphone 306 for voice communication. In addition the accessory comprises two microphones 307 for noise cancellation, one for noise cancellation for each loudspeaker, e.g. microphones positioned to pick up ambient noise signals at the left or right loudspeakers respectively or feedback noise cancellation microphones for the loudspeakers. Thus, unlike the accessory illustrated with respect to FIG. 2, an accessory according to embodiments may comprise more than three audio transducers.

In the embodiment of FIG. 3 rather than tie the left speaker to both pins A6 and B6 of the USB connector, and the right speaker to A7 and B7 as described with respect to FIG. 2, these four pins are allowed separate connections.

In the example illustrated in FIG. 3, pins B6 and B7 of the plug connector 302 are still connected to the right and left loudspeaker respectively as before, but pins A6 and A7 are connected to the right and left noise-cancellation microphones 307 respectively.

Thus, when the plug 302 is mated with the receptacle 304, in one orientation of the plug relative to the receptacle, receptacle pin A6 will mate with respective plug contact A6, and thus be connected to the right loudspeaker, and receptacle contact B6 will mate with respective plug contact B6 and be connected to the right noise cancellation microphone. In the other possible orientation, receptacle contact A6 will instead mate with plug contact B6 and be connected to the right noise cancellation microphone and receptacle contact B6 will mate with plug contact A6 and be connected with the right loudspeaker. Similarly depending on the orientation receptacle pin A7 will mate with plug pin A7 or B7 and be connected to the left noise cancellation microphone or the left loudspeaker and receptacle pin B7 will mate with the other contact.

The host device may therefore comprise a data controller for controlling transfer of data between a host device and a peripheral device via a USB Type-C connector of the host device. The data controller may comprise a path controller or path control module for establishing signal paths between circuitry of the host device and contacts of said USB Type-C connector. When the host device is connected to an accessory device requiring analogue audio signal paths the path controller is operable in a first mode to establish a plurality of signals paths for transfer of analogue audio data. However in contrast to the operation described with respect to FIG. 2 in the first mode the path controller is operable in the first mode to establish separate signal paths to each of at least first, second, third and fourth contacts of the USB Type-C connector, which may for example be the central two contacts of each row, i.e. contacts A6, A7, B6 and B7.

Note that as used herein the term signal path shall refer to a path that actually used or intended for use for the transfer of data and an audio signal path shall be interpreted accordingly. Thus such a signal path may be a path that transfers data for driving a loudspeaker for example or for readout of a microphone. A connection enabling a ground return, although possibly necessary for operation of a component, shall not be taken to be a signal path for transfer of data (although for the avoidance of doubt a microphone signal path may be a pseudo-ground, e.g. for connection to a differential microphone amplifier input independently of a ground return from loudspeakers). Likewise any connection for providing purely a supply voltage to a component would not constitute a signal path for the transfer of data (although for the avoidance of doubt a microphone signal path may be a phantom power supply, i.e. provide power supply current via a significant source impedance the voltage across which is modulated according to a microphone signal as is a commonplace for analogue electret microphones).

In some embodiments therefore the host device may comprise a switch array 309 for connecting the contacts of the USB receptacle 304 to appropriate signal paths in the host device. The switch array 309 may be controlled by a USB physical controller or USB transceiver or USB PHY 310. The USB physical controller 310 may therefore form at least part of the path controller.

It will be appreciated however that since contacts A6 and B6 and also contacts A7 and B7 are no longer shorted together, the ambiguity on 180 degree rotation of the plug relative to the receptacle requires some electrical method of determination. Thus the host device may be configured to determine a connection configuration for the peripheral device, i.e. an indication of whether the pins A6, A7, B6 and B7 are connected to loudspeakers or microphones of the peripheral device.

The host device may therefore comprise a discovery module configured to monitor the electrical properties of at least one contact of the USB Type-C receptacle 304 to determine a type of connection for that contact. The connection configuration may then be determined based on the type of connection determined for at least one contact of the USB Type-C connector and a plurality of predetermined possible connection configurations.

In one embodiment pins A8 and B8 may be used for the voice microphone and analog ground. In one embodiment the connections in the accessory device 300 may be restricted such that only a predefined arrangement with respect to the ground return pin is allowed. For example the pin of the plug 302 that provides the ground return may be specified to always be on the same row of pins as the contacts for the speakers. E.g. if plug pin B8 is the ground return then B6 and B7 are the speaker contacts and A6 and A7 are the contacts for the noise cancellation microphones and A8 is the contact for the voice microphone. In other words the set of possible configurations for an allowed accessory device, i.e. arrangement of loudspeakers and microphones in the accessory and their connections to the type-C plug, may be limited, e.g. to just one allowed configuration. This would consequently limit the set of possible connections, e.g. to just two possibilities due to the two possible mating orientations of the type-C plug to the type-C receptacle.

In such an embodiment in use the host device may determine which of receptacle pins A8 or B8 correspond to ground rather than a microphone impedance in order to determine the relative orientation of the plug. For example if receptacle pin A8 corresponds to ground then receptacle pins A6 and A7 are connected to the loudspeaker signal paths and receptacle pins B6-B8 are connected to the microphones.

However if a wider range of possibilities is to be tolerated, then other electrical measurements may be required, say of the impedances from other contacts to the determined ground line.

Having determined the connectivity, i.e. the connection configuration of the mated USB Type-C plug, the signals may be suitably switched for connection to or from circuitry such as microphone amplifiers and loudspeaker driver amplifiers.

Figure 4:
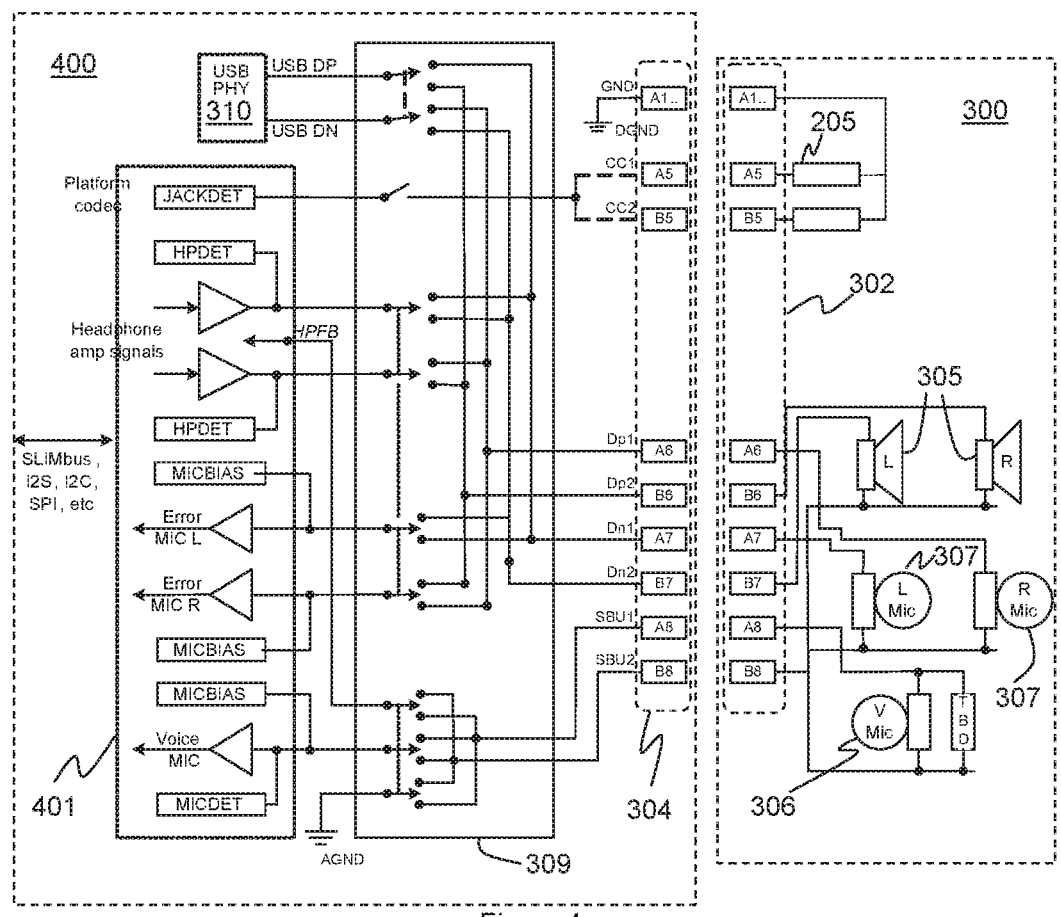
FIG. 4 illustrates a peripheral device and host device with connector arrangements according to embodiments of the invention.

FIG. 4 illustrates how an accessory or peripheral device 300 and a host device 400 may be configured according to embodiments of the invention. Similar components to those discussed previously with respect to the earlier figures are identified by the same reference numerals.

As before the accessory 300 has a type-C compatible connector 302 for connection to a type-C receptacle of the host device 400 and, in this example, has microphones 307 for noise cancellation purposes in addition to a voice microphone 306.

As before the host device has a type-C receptacle 304. Supervisory circuitry in the USB interface (not shown) may detect the impedances on the defined CC (configuration channel) contacts (pins A5 and B5) to sense the presence as well as the type of USB peripheral attached. Thus, on insertion of a type-C plug into the receptacle 304 or on power-up or restart, the USB supervisory system of the host device may perform conventional USB Type-C discovery. A standard Cable Detect (CD) function may be implemented by the host device in order to determine whether a plug is connected, and whether to a DFP (downstream facing port) or UFP (upstream facing port) and the orientation of the cable. This mechanism may rely on applying pull-up and pull-down resistors or current sources to the CC1 (A5) and CC2 (B5) pins and sensing a variety of voltage points associated with these lines.

Figure 5:
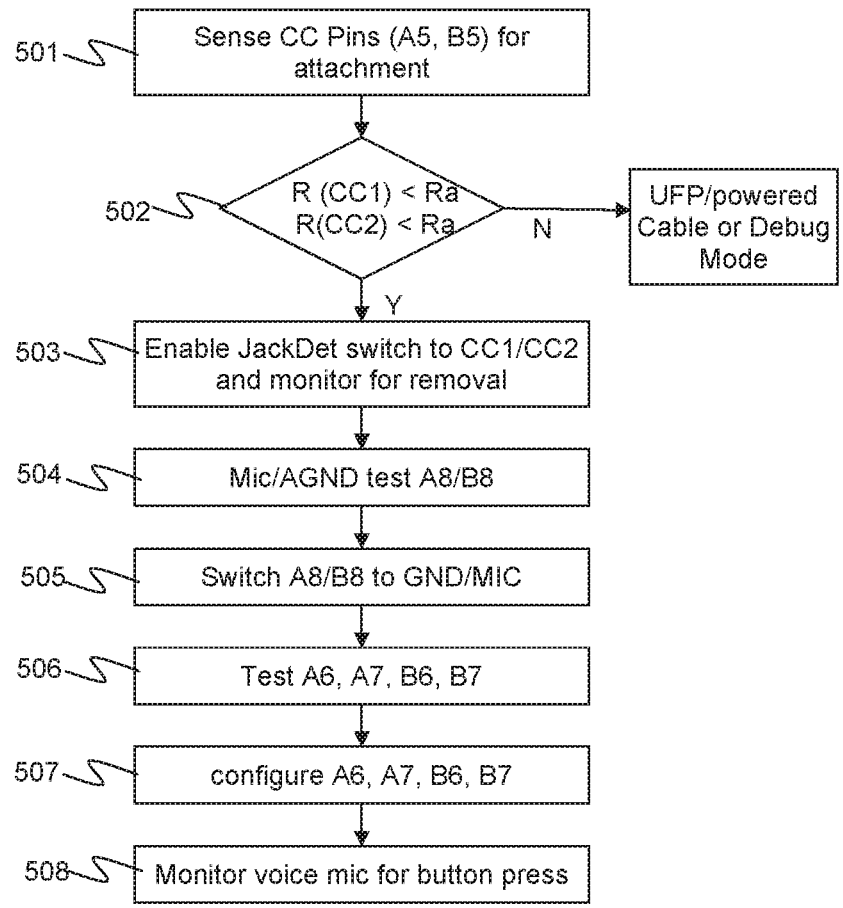
FIG. 5 illustrates a flowchart of a method of device discovery and configuration according to an embodiment of the invention.

FIG. 5 illustrates a method of discovery and configuration that may be employed by the host device according to an embodiment of the invention.

At step 501 the USB system may monitor the CC pins (A5 and B5) to monitor for attachment of a plug, for instance by monitoring the voltage. As a downstream facing port the USB system may effectively look for characteristic impedances Rd or Ra being connected to the CC pins (where Rd and Ra are defined in the USB type-C specification and Rd>Ra). If it is determined that a connection is present the combination of impedances present at the CC pins may be used to determine the type of connection and the orientation. Thus for example an impedance Rd connected to one CC pin with the other being open defines that a UFP is attached and provides the orientation by virtue of which CC pin is connected to Rd. An impedance Rd at one pin and Ra at the other implies a powered cable with a UFP attached whereas an impedance of Ra at one pin with the other being open implies a powered cable without a UFP.

As described above however if both pins A5 and B5 are connected to digital ground by an impedance less than a value Ra (wherein Ra equals 1.2 kohm) then an "Audio Accessory Adapter Mode" may be initiated. Thus at step 502 it may be determined whether both CC pins have impedances lower than a specific or threshold value i.e. Ra. If not then the system may enter an appropriate mode for a powered cable and/or UFP attached or enter debug mode (if both impedances indicated Rd attached). It will be appreciated therefore that the host device may operate in a USB mode for digital data transfer via the Type-C receptacle if an appropriate peripheral or hub is connected. In the USB mode the path controller of the host device, e.g. USB physical controller 310, may establish a pair of signal paths to either pins A6 and A7 or instead pins B6 and B7 (but not both pairs) to provide a differential digital data path.

If however both CC pins have impedances lower than a specific or threshold value i.e. Ra, then the host device may enter the analog accessory mode. This repurposes the at least some of the four central pins A6, A7, B6, and B7 to carry analogue signals to and/or from an audio codec 401. In the analogue mode of operation an audio controller, which may at least partly be implemented by the audio codec 401, may control establishment of suitable signal paths.

Note that the USB supervisory system could signal attachment or removal of the USB plug to the audio codec 401. Additionally or alternatively where the USB plug is connected to an adapter the detection may rely on the insertion of a suitable jack plug into the adapter and thus the USB supervisory circuitry could signal attachment or removal of the jack plug. However for better suppression of audible pops and clicks on attach and/or especially on detach it may be better for the codec to sense this directly.

This avoids any processing delays involved in the sense circuitry in the USB chip sensing the disconnection and communicating it to the codec, e.g. via some suitable GPIO (general purpose input-output) pin say. It will be appreciated that many existing codecs already sense the presence of a 3.5 mm jack using a mechanically switched contact to ground. As illustrated in FIG. 4 therefore the switch array 309 may comprise a switch for connecting the codec 401 to the CC pins A5 and/or B5 of the receptacle 304. On detection of connection of an analogue audio peripheral 300 the USB physical controller 310 may close this switch to enable jack detection (step 503) by a JACKDET module of the codec (note that as used herein the term jack detect shall include detection of insertion and/or removal of the USB type-C plug from the receptacle).

Once it has been identified that an analogue peripheral device is connected, the USB physical controller 310 and audio codec 401 may perform testing to determine a connection configuration for the attached peripheral device. As described above this may involve determining the type of load, if any, to which at least some of the contacts of the USB Type-C receptacle are connected. There may be a limited set of possible connection configurations based on allowed device configurations and the two possible mating orientations of the plug in the receptacle and the method may involve a discovery module determining the type of load for a certain number of contacts until a connection configuration can be correctly identified.

A discovery module may determine which of receptacle pins A8 and B8 is connected to ground and which is connected to the voice microphone. The discovery module may comprise a microphone detection module MICDET which may be connected to either pin A8 or B8 in sequence by appropriate control of the switch array 309 until the relevant voice microphone pin is detected.

One of the pins A8 and B8 may then be connected (504) to the common ground return from the accessory, termed analog ground or AGND. The microphone bias for the voice microphone and the output amplifier may be connected to the other pin.

In some embodiments the discovery process may indicate the type of accessory connected and whether it includes noise cancellation microphones. If noise cancellation microphones are present then, as mentioned above in some embodiments identification of the location of the ground return may define the connections for the loudspeakers and the noise cancelling microphones, and thus at this stage the USB physical controller may switch the switch array 309 to provide the relevant connections. In other words the configuration of the accessory may be signalled in some way (or limited to only one allowed configuration) and thus determining the connection configuration may simply involve determining the orientation of the plug relative to the socket, which may for instance be identified by locating the ground contact.

However in some embodiments it may be necessary to determine whether particular contacts of the type-C receptacle are connected to a loudspeaker or a microphone. For instance in the example illustrated in FIG. 4 the contacts that correspond to the loudspeakers and those that correspond to the noise cancellation microphones may need to be determined in step 506. This may, for example, involve transducer detection module, e.g. headphone detection modules HPDETECT in the codec 401, testing the various contacts, e.g. testing whether a headphone is connected to receptacle pin A6 or B6.

For example consider that a host device may be connected to a legacy accessory device via an adapter such as illustrated in FIG. 2 or to an accessory such as illustrated in FIG. 4. In both instances the presence of resistances lower than Ra on both the CC pins A5 and B5 may indicate that analogue signal paths are required. In both instances pins A8 and B8 are each connected to a respective one of analog ground and a voice microphone and so the discovery module may determine which pin is connected to which load. To differentiate between the legacy accessory connected via an adapter and the accessory of FIG. 4 the loads connected to pins A6 and B6 (or B7) may be determined. If both of these pins are connected to a loudspeaker then it can be determined (in this instance) that the receptacle is connected to a legacy accessory. However if one of these pins is connected to a microphone this could indicate an accessory as shown in FIG. 4. Having determined that the accessory is one such as shown in FIG. 4, and having determined which pin A6 or B6 corresponds to the microphone the connection configuration may then be clear and a data controller may then know which contacts correspond to which loudspeaker and to which noise cancelling microphone.

The determination whether a contact is connected to a microphone or a headset may be made in a number of ways by monitoring the electrical properties of the contact, e.g. the impedance. For instance a current could be injected into one terminal with a known ground contact also switched in for the ground return path, and the electrical response could be monitored at the input terminal and/or possibly some other terminal.

Once the orientation of the loudspeaker contacts and noise cancellation contacts are established a path controller or path control module may configure (507) the switch array accordingly, for example a path control module of the codec 401 may generate suitable control signals for the USB physical controller 310 and/or control the state of audio circuitry of the codec to establish the required signal paths.

Audio data transfer can then commence with the voice microphone channel being monitored (508) for button presses as is known in the art.

It is noted that in practice there may be some voltage drop across the AGND ground switches. This could give rise to cross talk from a loudspeaker to a microphone or from a microphone to a loudspeaker. Such cross-talk may be reduced by adding the developed voltage on the AGND node as a feedback signal to the drive voltage output by the headphone amplifiers. Thus as illustrated in FIG. 4 there may a feedback signal path, HPFB, which may be connected in the use to the relevant ground pin A8 or B8.

The switch array 309 may comprise an array of any suitable switches, and may typically comprise MOS switches or transmission gates. With suitable restrictions on the allowable configurations of a peripheral device, e.g. the connections between headset components and the pins of the type-C plug connected to the headset, the switches of the host device may be ganged as illustrated in FIG. 3 or 4. However in some embodiments there may be a range of possible different headset connections and the switch array may be such so as to allow various pins of the receptacle to be connected independently to a number of different signal paths within the host device. For instance some receptacle pins may be connected to a choice of possible MIC amplifiers or various headphone drivers.

FIG. 4 illustrates switches in each of the illustrated signal lines. However in some cases, especially with relatively restricted possible peripheral configurations, the switching action may be achieved in other ways, for instance making a driver amplifier or USB output go high-impedance, or turning off or just ignoring the output signal from an amplifier. In particular the voice microphone amplifier, say, may have a differential input fed from receptacle pins A8 and B8 with no intervening switch. In this case instead of swapping the signals paths AGND and MIC dependent on which pin is connected to the ground return of the peripheral the path controller of the host device may instead simply arrange for inversion of the polarity of the amplifier output signal either at the amplifier output or in downstream analogue or digital signal processing.

It should be noted that for a standard USB Type-C cable and plug, then according to the Type-C specification there may be no USB signal on the B6 and B7 connectors of the plug. It will be appreciated however that for a host device to operate as described above, contacts A6 and B6 (and A7 and B7) can not be shorted together and consequently the switch array 309 in the host device must be capable of connecting the correct signal paths to the receptacle contacts corresponding to plug contacts A6 and A7.

It should be appreciated that the connections described above are by way of example only and that other possible connections between the audio components of a peripheral or accessory device and the pins of a type-C connector may be possible. In general however pins A5 and B5 should be reserved as CC pins and preferably any analogue data may be transmitted via contacts A6-A8 and/or B6-B8 and especially via contacts A5, A6, B5 and B6.

Also it should be appreciated that FIGS. 3 and 4 illustrate embodiments with outgoing analogue connections from the host device to stereo loudspeakers and incoming analogue signals to the host device from multiple microphones, at least some of which may be for noise cancellation. It will be appreciated however that other combinations of microphones and/or loudspeakers may be enabled, for instance the peripheral could be a headset without a voice microphone but with left and right noise cancellation microphones. It will further be appreciated that the idea is also applicable to other combinations of analogue sources and sinks, and to signals flowing in either direction.

For example the peripheral device could be a speaker phone accessory with, say 5 microphones with analogue connections with the microphones enabled via plug pins A6, A7, A8, B6, and B7 with a ground return on B8.

In some embodiments the peripheral device may include at least some circuitry which is powered in use by a voltage provided on a voltage bus pin of the type-C connector. The type-C specification identifies pins A9 and B9 for use for supplying a voltage bus, $V_{BUS}$ for power delivery. In some embodiments therefore the host device may provide appropriate power on this $V_{BUS}$ connection to power a chip in the peripheral device.

The discussion above has focused on establishing multiple analogue audio channels. In some embodiments however at least one digital channel could be established in addition to some analogue data channels.

Figure 6:
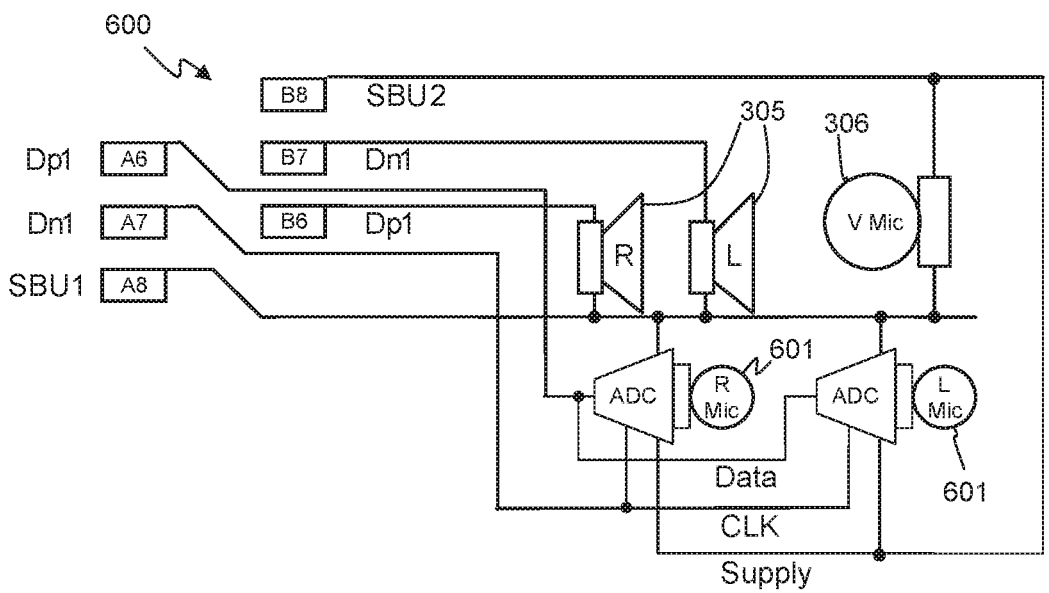
FIG. 6 illustrates a peripheral device according to another embodiment of the invention.

For instance FIG. 6 illustrates a peripheral or accessory device 600 which has left and right loudspeakers 305 and an analogue voice microphone 306. In this example however the accessory 600 has digital microphones 601 for noise cancellation.

In this example the right and left loudspeakers may be connected to pins B6 and B7 of a type-C plug of the accessory device as described previously and likewise the voice microphone and ground return may be connected to pins B8 and A8. In this example the two digital noise cancellation microphones are multiplexed onto a downstream digital signal path Dn at pin A7 with a bit clock being received via pin A6. The voice microphone bias may be used as a supply voltage to the digital microphones 601.

Any type of suitable digital data transfer could be used, for instance pins A6 and A7 could be used to provide a differential digital data bus with digital components powered from the microphone bias on pin B8 and/or any suitable single wire digital data protocol could be implemented separately on pins A6 and A7.

There are thus a number of possible operating modes that may be enabled. Table 1 below gives examples of some of the possible operating modes of a host device and an example of possible pin connections.

TABLE 1

| Pin | 1) 3.5 mm Adaptor Mode | 2) USB-C Audio Mode (1 MIC) | 3) USB-C Audio Mode (up to 5A) | 4) USB-C Audio Mode (3A 2D) |
| --- | --- | --- | --- | --- |
| A8 | MIC/AGND | MIC/AGND | Analogue 1/AGND | Power/AGND |
| A7 | Left | Left | Analogue 2 | Left/CLK |
| A6 | Right | Right | Analogue 3 | Right/Data |
| A5 | CC (<_Ra) | CC (<_Ra) | CC (<_Ra) | CC (<_Ra) |
| B8 | AGND/MIC | AGND/MIC | AGND/Analogue 1 | AGND/Power |
| B7 | Left | Left | Analogue 4 | CLK/Left |
| B6 | Right | Right | Analogue 5 | Data/Right |
| B5 | Vconn (<_Ra) | Vconn (<_Ra) | Vconn (<_Ra) | Vconn (<_Ra) |

Mode 1 is the Analogue Accessory Adapter Mode where a stereo accessory with a single microphone and a standard 3.5 mm audio jack may be connected via a suitable adapter. Mode 2 is a similar operating mode for an accessory with stereo speakers and a single microphone but where the accessory itself has a type-C compatible connector, e.g. connected via a captive cable.

Mode 3 is one example of a first mode according to embodiments of the invention where up to five analogue audio channels may be established, e.g. two outgoing analogue channels for stereo audio and three incoming for microphones, including for example left and right noise cancellation microphones.

Mode 4 is a hybrid mode with both analogue channels (e.g. up to three analogue channels) and also up to two digital channels. For example this mode may include the standard analogue channels as per mode 1 but also two digital wires for carrying Clock and Data signals of a digital communication channel as shown, or possibly alternatively for two one-wire digital communication channels as mentioned above.

As mentioned above embodiments of the present invention thus provide methods and apparatus for connecting a peripheral device to a host device via a general or multi-purpose connector such as a USB Type-C connector. Embodiments allow analogue data channels to be established such that audio components of the peripheral device may be operated with analogue driving/reading signal paths between the host and the peripheral and provide for more data channels than conventional approaches.

Embodiments allow for use of audio accessory device having at least four audio transducers, a first connector compatible with a USB Type-C connector and signal paths for transfer of audio signals between separate contacts of the first connector and respective ones of each of said at least four audio transducers, wherein at least a plurality of the signal paths are for transfer of analogue audio signals.

As mentioned one particular application is for establishing analogue data channels for at least stereo loudspeakers of a peripheral device whilst also establishing channels for reading data from noise cancellation microphones.

Figure 7:
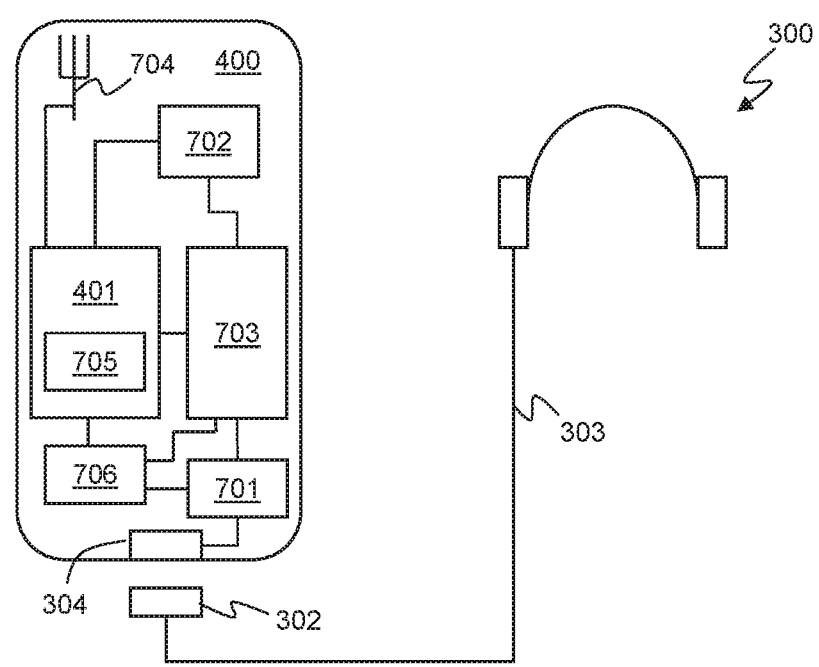
FIG. 7 illustrates one example of a host device.

FIG. 7 illustrates a host device 400, which may for example be a mobile telephone or a mobile computing device such as laptop or tablet computer. The mobile device may have a connector for connecting to peripheral or accessory devices and which may be a type-C receptacle 304. In use the host device may be connected to an accessory 300 by connecting a type-C plug 302 of the accessory to the receptacle 304 of the host device. The plug 302 may be connected to the rest of the accessory 300 via a connection 303 which may comprise a captive cable.

The type-C receptacle may be coupled to a USB interface circuit 701 which may include high speed USB 3.1 interfaces to other pins for example A2, A3, A4 or A9, A10, A11 of the USB Type-C connector. When an analogue accessory device is connected appropriate pins of the receptacle may be coupled to the USB interface circuit 701 and an audio codec 401 as described previously via a path controller 706 which may comprise a switch array 309.

The device includes data controller circuitry to control discovery and configuration of the signal paths from receptacle to USB interface and audio codec. This data controller circuitry may be incorporated in part or in whole in one or more of the USB interface 701, audio codec 401, applications processor 703 or path controller 706 itself. For instance circuitry to detect standard USB operation may be incorporated in the USB interface circuitry, but once Analog Adapter Accessory Mode is detected control may be substantially handed over to control circuitry within the audio codec.

The data controller circuitry may be specially designed or hard-wired to perform appropriate functions, or may at least partially comprise general purpose programmable circuitry that may operate according to code or instructions stored in a part of local memory 702 which may comprise non-volatile memory elements.

The audio codec 401 may transmit analogue audio data to accessory 300 for playback via the loudspeakers of the accessory 300. The audio data may include audio data from a media file stored in memory 702 which may be received directly from the memory or via an applications processor 703. In some instances the audio data may be generated by the applications processor 703 or by the audio codec under instruction from the applications processor 703. The audio data could be audio data received via a communications interface such as an antenna 704 for wireless communication.

In addition the audio codec 401 may receive audio data from the accessory 300. This may for instance be analogue voice data from a voice microphone to be transmitted via antenna 704, stored in a media file in memory 702 or processed for controlling the applications processor 703. The audio codec 401 may also receive audio data from noise cancellation microphones of the accessory 300. This data may also be transferred via an analogue data path although for an accessory 600 such as illustrated in FIG. 6 the incoming noise cancellation data may be digital. A noise cancellation module 705 of the codec 401 may determine appropriate noise cancellation signals and modulate the outgoing analogue loudspeaker data accordingly.

The skilled person will thus recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile telephone, an audio player, a video player, a PDA, a mobile computing platform such as a laptop computer or tablet and/or a games device for example. Embodiments of the invention may also be implemented wholly or partially in accessories attachable to a host device, for example in active speakers or headsets or the like. Especially in more complex devices, there may be more than one USB Type-C or similar connector and associated signal paths and control per aspects of the invention.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope. Terms such as amplify or gain include possibly applying a scaling factor of less than unity to a signal.

The invention claimed is:

1. A signal controller for controlling transfer of signals between a host device and a peripheral device via a USB Type-C connector of the host device, the signal controller comprising:
    a path controller for establishing signal paths between circuitry of the host device and contacts of said USB Type-C connector,
    wherein the path controller is operable in at least first and second modes, wherein:
        in the first mode the path controller establishes separate signal paths to each of at least first, second, third and fourth contacts of the USB Type-C connector, wherein a plurality of said signal paths are for transfer of analogue audio signal; and
        in the second mode the path controller establishes a pair of signal paths to only a subset of said first to fourth contacts of the USB Type-C connector, wherein the pair of signal paths are for transfer of differential digital signals;
    wherein, when entering the first mode, the signal controller is configured to determine a connection configuration for the peripheral device, wherein the connection configuration indicates whether each of the first to fourth contacts of the USB Type-C connector is connected to a microphone or a loudspeaker of the peripheral device, and wherein the path controller establishes the signal paths in the first mode based on the determined connection configuration, further comprising a discovery module configured to monitor the electrical properties of at least one contact of the USB Type-C connector to determine a type of connection for that contact, wherein the discovery module is configured to determine which of at least two predetermined additional contacts of the USB Type-C connector is a ground contact connected to a ground return for the peripheral device and the path controller is further operable to establish a ground path to said determined ground contact.

2. A signal controller as claimed in claim 1 wherein, in the first mode the path controller additionally establishes a separate analogue signal path to one of at least a fifth or sixth contact of the USB Type-C controller.

3. A signal controller as claimed in claim 1 wherein the discovery module is configured, when entering the first mode, to monitor the electrical properties of at least one of said first to fourth contacts of the USB Type-C connector to determine whether the respective contact is connected to a microphone or a loudspeaker of the peripheral device.

4. A signal controller as claimed in claim 1 wherein the signal controller is configured to determine the connection configuration based on the type of connection determined for at least one contact of the USB Type-C connector and a plurality of predetermined possible connection configurations.

5. A signal controller as claimed in claim 1 wherein the signal controller comprises a switch array connected to the USB Type-C controller, wherein the path controller controls the switch array to provide at least some of said signal paths in the first mode.

6. A signal controller as claimed in claim 5 wherein said switch array comprises a first set of switches, the first set of switches being operable, in the first mode:
  in a first switch state to connect the first and second contacts to first and second signal paths respectively and to connect the third and fourth contacts to third and fourth signal paths respectively; and
  in a second switch state to connect the first and second contacts to the third and fourth signal paths respectively and to connect the third and fourth contacts to the first and second signal paths respectively.

7. A signal controller as claimed in claim 1 wherein at least one of said signal paths in the first mode is a loudspeaker signal path for transfer of analogue audio signals from an amplifier of the host device to drive a loudspeaker of the peripheral device.

8. A signal controller as claimed in claim 1 wherein at least one of said signal paths in the first mode is a microphone signal path for transfer of audio signals received from a microphone of the peripheral device to audio processing circuitry in the host device.

9. A signal controller as claimed in claim 8 wherein at least one microphone signal path is an analogue signal path for transfer of analogue audio signals received from a microphone of the peripheral device, a digital signal path for transfer of digital audio signals received from at least one digital microphone of the peripheral device, or a signal path for audio signals received from a noise cancellation microphone and said audio processing circuitry comprises noise cancellation circuitry.

10. A signal controller as claimed in claim 1 wherein the path controller is further operable in a third mode to establish just two analogue signal paths to said first to fourth contact for transfer of left and right analogue stereo audio data to loudspeakers of a peripheral device.

11. An electronic device comprising:
  a USB Type-C connector; and
  a signal controller as claimed in claim 1.

12. An electronic device as claimed in claim 11 further comprising an audio codec wherein the path controller is configured, in the first mode, to establish said signals paths between the USB Type-C connector and the audio codec.

13. An electronic device as claimed in claim 11 further comprising a USB controller wherein the path controller is configured, in the second mode, to establish said signals paths between the USB Type-C connector and the USB controller.

14. An electronic device as claimed in claim 11 wherein the electronic device is at least one of: a portable device; a battery powered device; a communications device; a computing device; a mobile telephone; a laptop, notebook or tablet computer; a personal media player; a gaming device; and a wearable device.

15. A signal controller as claimed in claim 1 wherein the USB Type-C connector comprises first and second rows of contacts and said first and second contacts are the central two contacts of the first row and said third and fourth contacts are the central two contacts of the second row.

* * * * *